United States Patent
McThrow et al.

(10) Patent No.: US 12,321,391 B2
(45) Date of Patent: Jun. 3, 2025

(54) ENHANCING GRAPH EXPLAINABILITY THROUGH GRAPH ANALYSIS ALGORITHMS

(71) Applicant: Fujitsu Limited, Kawasaki (JP)

(72) Inventors: Michael McThrow, Capitola, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/322,495

(22) Filed: May 23, 2023

(65) Prior Publication Data

US 2024/0394308 A1    Nov. 28, 2024

(51) Int. Cl.
*G06F 16/901*    (2019.01)
*G06N 3/08*    (2023.01)

(52) U.S. Cl.
CPC ........... *G06F 16/9024* (2019.01); *G06N 3/08* (2013.01)

(58) Field of Classification Search
CPC ............................. G06F 16/9024; G06N 3/08
USPC ........................................ 707/741, 756, 798
See application file for complete search history.

(56) References Cited

U.S. PATENT DOCUMENTS

| | | | | |
|---|---|---|---|---|
| 2008/0243770 | A1* | 10/2008 | Aasman | G06F 16/28 707/E17.012 |
| 2015/0229662 | A1* | 8/2015 | Hitt | H04L 63/1425 726/23 |
| 2016/0125087 | A1* | 5/2016 | Mallah | G06F 16/90332 705/14.54 |
| 2022/0147569 | A1* | 5/2022 | Cooley | G06N 20/10 |
| 2023/0385347 | A1* | 11/2023 | Leveau | G06N 5/022 |

OTHER PUBLICATIONS

Koji Maruhashi, Masaru Todoriki, Takuya Ohwa, Keisuke Goto, Yu Hasegawa, Hiroya Inakoshi, Hirokazu Anai. Learning Multi-Way Relations via Tensor Decomposition With Neural Networks, AAAI, 2018.

Ganesan, B., Parkala, S., Singh, N. R., Bhatia, S., Mishra, G., Pasha, M. A., . . . Naganna, S. (2020). Link Prediction using Graph Neural Networks for Master Data Management. arXiv.

(Continued)

*Primary Examiner* — Phong H Nguyen
(74) *Attorney, Agent, or Firm* — Maschoff Brennan

(57) ABSTRACT

A method may include obtaining a dataset of graph-structured data, the dataset including one or more subgraphs. The method may include determining a correlation between analyses of the dataset using graph explainable artificial intelligence (GXAI) techniques and using a plurality of graph analysis algorithms. A ranked list of the plurality of graph analysis algorithms may be generated based on the correlation. The method may further include determining general characteristic of the dataset of graph-structured data, the general characteristic indicative of similarities among the one or more subgraphs. A threshold number of the graph analysis algorithms may be assigned to the general characteristic based on the ranked list of the plurality of graph analysis algorithms. An assignment table may be generated including the general characteristic and the threshold number of the graph analysis algorithms. A display may be generated within a graphical user interface (GUI) that visualizes the assignment table.

20 Claims, 5 Drawing Sheets

(56) References Cited

OTHER PUBLICATIONS

Milo, R., Shen-Orr, S., Itzkovitz, S., Kashtan, N., Chklovskii, D., & Alon, U. (2002). Network Motifs: Simple Building Blocks of Complex Networks. Science, 824-827.

F. Baldassarre and H. Azizpour, "Explainability techniques for graph convolutional networks," in International Conference on Machine Learning (ICML) Workshops, 2019 Workshop on Learning and Reasoning with Graph-Structured Representations, 2019.

P. E. Pope, S. Kolouri, M. Rostami, C. E. Martin, and H. Hoffmann, "Explainability methods for graph convolutional neural networks," in Proceedings of the IEEE Conference on Computer Vision and Pattern Recognition, 2019, pp. 10 772-10 781.

T. Funke, M. Khosla, and A. Anand, "Hard masking for explaining graph neural networks," 2021. [Online]. Available: https://openreview.net/forum?id=uDN8pRAdsoC.

M. S. Schlichtkrull, N. D. Cao, and I. Titov, "Interpreting graph neural networks for NLP with differentiable edge masking," in International Conference on Learning Representations, 2021.

X. Wang, Y. Wu, A. Zhang, X. He, and T. seng Chua, "Causal screening to interpret graph neural networks," 2021. [Online]. Available: https://openreview.net/forum?id=nzKv5vxZfge.

R.Schwarzenberg, M.Hu bner, D.Harbecke, C.Alt, and L.Hennig, "Layerwise relevance visualization in convolutional text graph classifiers," arXiv preprint arXiv:1909.10911, 2019.

T. Schnake, O. Eberle, J. Lederer, S. Nakajima, K. T. Schutt, K.-R. Muller, and G. Montavon, "Higher-order explanations of graph neural networks via relevant walks." IEEE transactions on pattern analysis and machine intelligence, vol. PP, 2021.

Q. Huang, M. Yamada, Y. Tian, D. Singh, D. Yin, and Y. Chang, "Graphlime: Local interpretable model explanations for graph neural networks," arXiv preprint arXiv:2001.06216, 2020.

Y. Zhang, D. Defazio, and A. Ramesh, "Relex: A model-agnostic relational model explainer," arXiv preprint arXiv:2006.00305, 2020.

M. Vu and M. T. Thai, "Pgm-explainer: Probabilistic graphical model explanations for graph neural networks," in Advances in Neural Information Processing Systems, H. Larochelle, M. Ranzato, R. Hadsell, M. F. Balcan, and H. Lin, Eds., vol. 33. Curran Associates, Inc., 2020, pp. 12 225-12 235.

H. Yuan, J. Tang, X. Hu, and S. Ji, "XGNN: Towards model-level explanations of graph neural networks," ser. KDD '20. New York, NY, USA: Association for Computing Machinery, 2020, p. 430-438. [Online]. Available: https://doi.org/10.1145/3394486.3403085.

Z. Ying, D. Bourgeois, J. You, M. Zitnik, and J. Leskovec, "Gnnexplainer: Generating explanations for graph neural networks," in Advances in neural information processing systems, 2019, pp. 9244-9255.

D. Luo, W. Cheng, D. Xu, W. Yu, B. Zong, H. Chen, and X. Zhang, "Parameterized explainer for graph neural network," in Advances in Neural Information Processing Systems, H. Larochelle, M. Ranzato, R. Hadsell, M. F. Balcan, and H. Lin, Eds., vol. 33. Curran Associates, Inc., 2020, pp. 19 620-19 631.

H. Yuan, H. Yu, J. Wang, K. Li, and S. Ji, "On explainability of graph neural networks via subgraph explorations," in Proceedings of The 38th International Conference on Machine Learning, 2021, pp. 12 241-12 252.

K Xu, W. Hu, J. Leskovec, S. Jegelka, "How Powerful are Graph Neural Networks," In International Conference on Learning Representations, 2019.

T. Kipf and M. Welling, "Semi-supervised classification with graph convolutional networks," In International Conference on Learning Representations (ICLR), 2017.

P. Velickovic, G. Cucurull, A. Casanova, A. Romero, P. Lio, Y. Bengio, "Graph Attention Networks," In International Conference on Learning Representations, 2018.

\* cited by examiner

ENHANCING GRAPH EXPLAINABILITY THROUGH GRAPH ANALYSIS ALGORITHMS

FIELD

The embodiments discussed in the present disclosure are generally related to enhancing graph explainability through graph analysis algorithms.

BACKGROUND

A dataset in a graph structure may be analyzed using graph analysis algorithms. For example, the graph analysis algorithms may provide information about overall structure of the dataset, including patterns and anomalies. However, there may exist a large number of the graph analysis algorithms, which may make it difficult to determine which of the graph analysis algorithms should be used for the dataset.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include obtaining a dataset of graph-structured data, dataset including one or more subgraphs. The method may further include determining a correlation between analyses of the dataset of graph-structured data using graph explainable artificial intelligence (GXAI) techniques and using a plurality of graph analysis algorithms. A ranked list of the plurality of graph analysis algorithms may be generated based on the correlation. The method may further include determining general characteristic of the dataset of graph-structured data, the general characteristic indicative of similarities among the one or more subgraphs. The method may further include assigning a threshold number of the graph analysis algorithms to the general characteristic based on the ranked list of the plurality of graph analysis algorithms. An assignment table may be generated including the general characteristic and the threshold number of the graph analysis algorithms. A display may be generated within a graphical user interface (GUI) that visualizes the assignment table.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
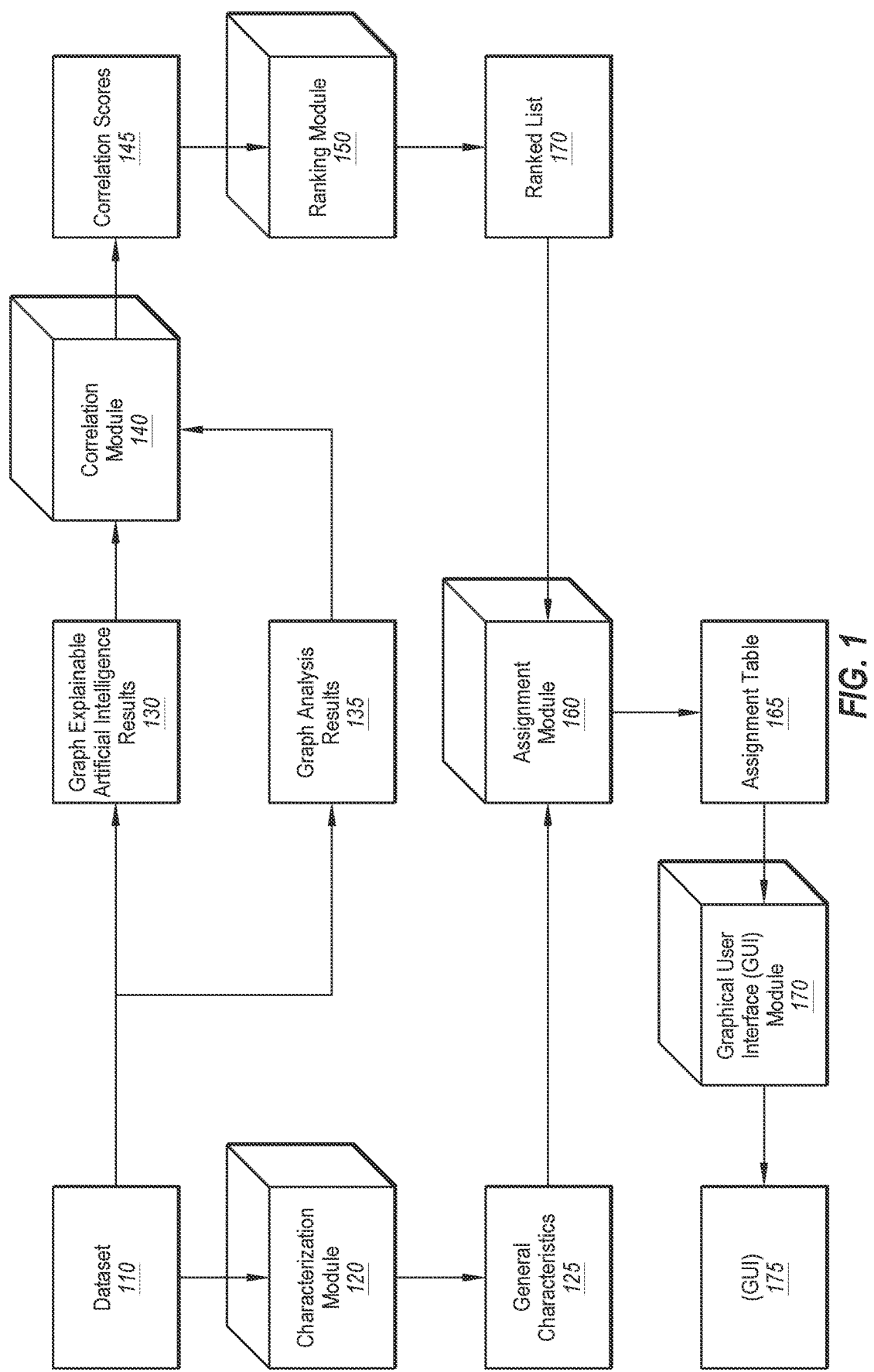
FIG. 1 illustrates a diagram illustrating an example process flow for classifying graph analysis algorithms.

Information may be included in datasets and the datasets may be presented in graph form (referred to as "graph-structured data"). Graph-structured data may be analyzed using graph explainable artificial intelligence (GXAI) techniques or graph analysis algorithms. The graph analysis algorithms may provide insights and explanations regarding the graph-structured data, such as predicting behavior patterns, identifying important nodes or edges, and identifying anomalous characteristics of the corresponding dataset. The GXAI techniques may include providing the graph-structured data to a machine-learning model or other artificial-intelligence-enabled computing system to evaluate the corresponding dataset. The GXAI techniques may provide insights and analyses of the graph-structured data, which may cover different perspectives or provide more comprehensive analyses than the results of the graph analysis algorithms. However, the results provided by the GXAI techniques may be difficult for users, such as data scientists, to understand because the GXAI results may be presented in an unfamiliar, unconventional, or complex format; therefore, such results may not be user friendly. Additionally or alternatively, the GXAI results may cover a wide variety of metrics or details regarding the graph-structured data such that the users reviewing the GXAI results may not properly or effectively interpret the GXAI results, which may still require the users to drill down through many layers to get to the desired information to evaluate the dataset of an AI model. For example, analyzing a particular dataset of graph-structured data using a particular GXAI technique may yield contribution scores corresponding to each node or edge included in the particular dataset in which the contribution scores denote how each of the nodes or edges contribute to a particular classification or regression analysis of the particular dataset.

The present disclosure relates to, among other things, methods and/or systems that may be used to identify graph analysis algorithms that may be more effective for certain types of datasets of graph-structured data.

In some embodiments, a method may include determining a correlation between GXAI results and the graph analysis algorithm results relating to the same dataset of graph-structured data. The correlation may provide users with better understanding of how well each graph analysis algorithm analyzes the dataset of graph-structured data. The graph analysis algorithms may be ranked according to the correlation and a threshold number of graph analysis algorithms may be assigned to a first general characteristic of the dataset of graph-structured data. The first general characteristic of the dataset may indicate common characteristics among multiple subgraphs that may be included within the dataset of graph-structured data. The assignment may allow users to associate certain graph analysis algorithms with the first general characteristic, which may improve efficiency of selecting graph analysis algorithms for analysis of other datasets. For example, in some instances, a second dataset of graph-structured data that may have a second general characteristic similar to the first general characteristic. It may be determined which graph analysis algorithms may be effective for the second dataset of graph-structured data based on the graph analysis algorithms assigned to the first general characteristic. As such, ranking the graph analysis algorithms and assigning the graph analysis algorithms to general characteristics of datasets of graph-structured data according to some embodiments of the present disclosure may improve efficiency and interpretability of analyses of datasets of graph-structured data.

Turning to the figures, FIG. 1 is a diagram illustrating an example process flow 100 for classifying graph analysis algorithms according to at least one embodiment of the present disclosure. In some embodiments, the process 100 may include a characterization module 120 that is configured to obtain a dataset 110 of graph-structured data.

In some embodiments, the dataset 110 may provide a visual interpretation of data and represent relationship between different variables of the dataset 110. For example, the dataset 110 may include collections of financial transactions. The dataset 110 may visualize the financial transactions involving different people or entities. In some embodiments, the dataset 110 may include one or more subgraphs. For example, each collection of the financial transactions may be represented as a subgraph within the dataset 110. For instance, an example subgraph may include a particular person and/or an entity involved in the financial transactions as nodes. The subgraph may represent different financial transactions that the particular person and/or the entity were involved in, each transaction represented by edges. For example, the edges may include purchases, withdrawals, payments, among others. In some embodiments, the dataset 110 may be organized into one or more subgraphs. For example, the dataset 110 may include the financial transactions related to a bank. In these instances, the dataset 110 may be organized into the one or more subgraphs according to different parameters. For example, the one or more subgraphs may each include a type of transactions the bank was involved in such as withdrawals and deposits. In another example, the one or more subgraphs may each include transactions with different types of customers such as individuals and businesses.

In some embodiments, one or more graph analysis algorithms may be obtained. The one or more graph analysis algorithms may include any analysis techniques of graph-structured data that may be used to represent one or more aspects of a dataset of graph-structured data. For instance, the one or more selected graph analysis algorithms may include predicting behavior patterns, identifying important nodes and edges, and/or identifying anomalous characteristics of the dataset 110. In some embodiments, the one or more graph analysis algorithms may include graph analysis algorithms that may be publicly available. For example, in some embodiments, the one or more graph analysis algorithms may be obtained from a public repository and/or a public library containing a collection of graph analysis algorithms. For example, NetworkX, a Python library containing implementations of hundreds of graph analysis algorithms, may be used to obtain the one or more graph analysis algorithms. Any other suitable repository and/or a library containing a collection of graph analysis algorithms may be used.

In some embodiments, a subset of graph analysis algorithms may be selected from the collection of graph analysis algorithms. For example, the one or more graph analysis algorithms may include a part of the collection of graph analysis algorithms. In some embodiments, the selection may be made based on the process 100 being configured to classify the one or more graph analysis algorithms. For example, the process 100 may predetermine which of the one or more graph analysis algorithms may be more effective for the dataset 110. In some embodiments, the predetermination may be made based on different features of the dataset 110. For example, where the dataset 110 has a large number of nodes, graph analysis algorithms related to nodes may be selected. In another instance, the dataset 110 may only have a small number of nodes. In these instances, graph analysis algorithms such as a node index analysis may not be as applicable. In some embodiments, the selection may be made based on types of graph analysis algorithms available. For example, a certain number of each type of algorithms may be included. For instance, five graph analysis algorithms related to each type such as shortest path, clique detection, coloring, and clustering may be selected.

In some embodiments, the types of graph analysis algorithms may include community detection (which may be configured to evaluate how groups of nodes are clustered), similarity (which may be configured to determine a degree of similarity between data in the dataset 110 such as among the one or more subgraphs), centrality (which may be configured to identify central nodes), heuristic link prediction (which may be configured to predict potential future links based on score functions), coloring algorithms (which may be configured to assign different color labels to each vertex), and pathfinding and search (which may be configured to explore routes between nodes), among other types of graph analysis algorithms.

In some embodiments, the dataset 110 may be analyzed using graph neural networks (GNNs). For example, a machine-learning (ML) model may be trained using the GNNs. The ML model may be trained on the dataset 110 to analyze graph-structured data. For example, the ML model may be trained to generate GNN predictions at node, edge, and graph levels of the graph-structured data. For instance, the GNN predictions performed by the ML model may include node labeling, node and edge prediction, clustering, among others. In some embodiments, different GNN architecture may be used to train the ML model. For example, graph isomorphism network (GIN), graph convolutional network (GCT), and/or graph attention network (GAT) may be used. In some embodiments, any other suitable GNN architectures may be used.

In some embodiments, the GNN predictions may be evaluated to detect reliability, potential biases, and/or errors. Additionally or alternatively, decision-making processes of the GNN predictions may be detected. In some embodiments, one or more explanation methods may be utilized to explain the decision-making processes. For example, the one or more explanation methods may include SA, Guided BP, CAM, Grad-CAM, GNNExplainer, PGExplainer, GraphMask, ZORRO, causal screening, SubgraphX, LRP, Excitation BP, GNN-LRP, PGM-Explainer, XGNN, among others. In some embodiments, the one or more explanation methods may include varying design elements that characterize the one or more explanation methods. Some examples of the design elements may include type, learning (e.g., whether learning procedures are involved), task (e.g., tasks each method can be applied to), target (e.g., targets of explanation), black-box (whether the GNN is treated as a block-box during explanation), flow (computation flow for explanations), and design (whether an explanation method has specific designs for graph-structured data). In these and other embodiments, each of the one or more explanation methods may include one or more of the design elements.

In some embodiments, the process 100 may include a correlation module 140 that is configured to obtain GXAI analysis results 130 and graph analysis results 135. For example, the GXAI analysis results 130 may be obtained from the one or more explanation methods and the graph analysis results 135 may be obtained from the one or more graph analysis algorithms. In some embodiments, the GXAI analysis results 130 and the graph analysis results 135 may be computed by the process 100. In some embodiments, the GXAI analysis results 130 and the graph analysis results 135 may be provided from another system or may be retrieved from a data storage.

In some embodiments, the GXAI analysis results 130 may include contribution scores. For example, analyzing a particular dataset of graph-structured data using a particular GXAI analysis technique may yield the contribution scores corresponding to each node or edge included in the particular dataset in which the contribution scores denote how each of the nodes or edges contribute to a particular classification or regression analysis of the particular dataset (or in other words, particular edge or particular node influences the GXAI analysis more strongly).

In some embodiments, the contribution scores may be stored as vector representations such that each element of the vector may correspond to a respective edge or node of a particular dataset of graph-structured data. A greater contribution score for a particular edge or a particular node may indicate that the particular edge or the particular node provides a greater contribution to a classification or regression result of the GXAI analysis (or in other words, the particular edge or the particular node influences the GXAI analysis more strongly). In these and other embodiments, the elements of the vector representations of the GXAI analysis (i.e., the contribution scores of each node or edge) may be normalized to facilitate comparison of the vector representations of the GXAI analysis with results of various graph analysis algorithms as described below.

In some embodiments, the graph analysis results 135 may include insights and explanations regarding the dataset 110 of graph-structured data. For example, the graph analysis results 135 may include results of applying the graph analysis algorithms to the dataset 110.

In these and other embodiments, the GXAI analysis results 130 and the graph analysis results 135 may be stored as one or more vector representations of the analyses of the graph-structured data. For example, a particular analysis based on the nodes of a particular dataset of graph-structured data may generate a node vector in which each element of the node vector corresponds to analysis results associated with a particular node of the particular dataset. As another example, a particular analysis based on the edges of a particular dataset of graph-structured data may generate an edge vector in which each element of the edge vector corresponds to analysis results associated with a particular edge of the particular dataset.

The correlation module 140 may determine correlation scores 145 based on the GXAI analysis results 130 and the graph analysis results 135. The correlation module 140 may, for example, obtain vector representations corresponding to each of the GXAI analysis results 130 and the graph analysis results 135 to determine a degree of similarity between the vector representations. For instance, a Pearson correlation coefficient may be computed based on the vector representations. Additionally or alternatively, a cosine similarity may be determined between the vector representations. In this and other examples, the degree of similarity between the GXAI analysis results 130 and the graph analysis results 135 may be represented as the correlation score 145. In some embodiments, the correlation scores 145 may be presented in a table format. For example, the correlation module 140 may generate a correlation table that includes at least a first column including the graph analysis algorithms and a second column including the correlation scores 145 that correspond to the graph analysis algorithms.

In some embodiments, the process 100 may include a ranking module 150 that is configured to obtain the correlation scores 145 and the graph analysis algorithms. In these and other embodiments, the ranking module 150 may be configured to generate a ranked list 155 of the graph analysis algorithms based on the correlation scores 145. For example, in some embodiments, the graph analysis algorithms may be listed in a descending order of corresponding correlation scores. For instance, the ranking module 150 may generate the ranked list 155 with at least a first column and a second column. In some embodiments, the first column may include the graph analysis algorithms, and the second column may include ranks of corresponding graph analysis algorithms in the first column. In these and other embodiments, the ranking module 150 may sort the obtained graph analysis algorithms according to the correlation scores 145. For example, the graph analysis algorithms may be sorted in a descending order of the correlation scores 145. In some embodiments, the graph analysis algorithms included in the ranked list 155 may be given a rank according to the order and be sorted according to the correlation scores 145. For example, a graph analysis algorithm with the highest correlation score may be given the highest rank (e.g., 1). Each of the graph analysis algorithms in the ranked list 155 may be given a rank. In some embodiments, generating the ranked list 155 may be illustrated and discussed in more detail with respect to FIG. 4 of the present disclosure.

In some embodiments, the process 100 may include a characterization module 120 that is configured to obtain the dataset 110. In some embodiments, the characterization module 120 may be configured to determine the general characteristic 125 of the dataset 110. The general characteristic 125 may be indicative of similarities among the one or more subgraphs included in the dataset 110. In some embodiments, the similarities among the one or more subgraphs may include structural similarities among the one or more subgraphs, such as graph topology, node connections, and node neighborhoods. For example, a clustering algorithm may be applied to the dataset 110 to determine the general characteristic 125 of the dataset 110. For instance, the clustering algorithm may partition nodes in the one or more subgraphs into groups or clusters. The partitioning may be done based on topological criteria such as graph structure and/or location of nodes on a graph. For example, k-Means clustering may be used, which may be configured to identify a number of centroids and match each node to a closest centroid. The centroids may be optimized by determining mean values of nodes connected to each centroid. For example, the centroids may be optimized so that the nodes connected to each centroid may be at a similar distance from the centroid. In some embodiments, the general characteristic 125 of the dataset 110 may include one or more of a number of the centroids, average distance of the nodes from the centroids, and number of the nodes connected to the centroids.

In some embodiments, the general characteristic 125 may be represented numerically. For example, in some embodiments, the general characteristic 125 may be represented as a vector. In these and other embodiments, each of the one or more subgraphs may be converted to a vector representation. The vector representation may be generated using any suitable graph embedding techniques. For example, the graph embedding techniques may include any techniques that may map each of the one or more subgraphs into a fixed length vector that captures features of the one or more subgraphs. The general characteristic 125 may be determined by computing an average of the vector representation of each of the one or more subgraphs.

In some embodiments, the process 100 may include an assignment module 160. The assignment module 160 may be configured to obtain the general characteristic 125 and the ranked list 155. In some embodiments, the assignment module may be configured to generate an assignment table 165 assigning or associating the general characteristic 125 with the one or more graph analysis algorithms listed in the ranked list 155. For example, top performing graph analysis algorithms may be assigned to the general characteristic 125. For instance, the top-performing graph analysis algorithms may be the graph analysis algorithms with highest correlation scores which may be derived from the ranked list 155. In some embodiments, the assignment table 165 may include at least a characteristic column and an algorithm column. In some embodiments, the characteristic column may include the general characteristic 125. In these and other embodiments, the algorithms column may include the one or more graph analysis algorithms. For example, the algorithms column may include the first column of the ranked list 155. For instance, the graph analysis algorithms may be listed in the algorithms column in an order ranked based on the correlation scores 145.

In some embodiments, a threshold number of the graph analysis algorithms may be included in the assignment table 165. For example, in some embodiments, the threshold number may define a number of graph analysis algorithms to be included in the assignment table 165. For instance, the number of graph analysis algorithms with the highest ranks may be included in the assignment table 165. In some embodiments, the threshold number may be provided by users (e.g., data scientists) seeking to analyze the dataset 110. In some embodiments, the threshold number may be determined based on size of the dataset 110. For example, larger dataset may have higher threshold number. In yet another embodiment, the threshold number may be determined based on number of the graph analysis algorithms that are listed in the ranked list 155. For example, the threshold number may be ten percent of total number of the graph analysis algorithms in the ranked list 155.

In some embodiments, the assignment table 165 may be obtained by a GUI module 170, which may be configured to cause a GUI 175 to present information in a particular manner. For example, the GUI module 170 may be configured to instruct the GUI 175 to present the assignment table 165. Additionally or alternatively, the GUI module 170 may be configured to obtain and display the correlation scores 145. For example, the GUI 175 may include a drop-down menu (or any other graphical selection tool) with which a user of the GUI 175 may interact to select one or more of subgraphs in the dataset 110. A subgraph summary may include summarized information about the particular subgraph selected via the drop-down menu. For example, the subgraph summary may include a GXAI explainability score (e.g., an element of a contribution score relating to the particular subgraph), the number of nodes included in the particular subgraph, the number of edges included in the particular subgraph, or any other statistic associated with the particular subgraph. In these and other embodiments, the subgraph summary may further include a graph analysis result generated by a particular graph analysis algorithm.

In some embodiments, the GUI 175 may display a summary of various statistics relating to the dataset 110. For example, the summary may include a number of subgraphs included in the dataset 110, an average number of nodes included with each of the subgraphs, an average number of edges associated with each of the subgraphs, a training accuracy of a machine-learning model that obtained the dataset 110, a testing accuracy of the machine-learning model that obtained the dataset 110, or any other statistics associated with the particular dataset. In some embodiments, the summary of various statistics relating to the dataset 110 may assist the users with identifying which graph analysis algorithms may best fit the dataset 110. For example, the one or more graph analysis algorithms to be applied to the dataset 110 may be selected based on the summary presented. For instance, type graph analysis algorithm may be selected based on a type of data present in the dataset 110. In some embodiments, the summary may assist the users in determining the threshold number of the graph analysis algorithms to be included in the assignment table 165. For example, the users may determine the threshold number to be higher with more complex datasets.

Modifications, additions, or omissions may be made to the process 100 without departing from the scope of the present disclosure. For example, the process 100 may include more or fewer elements than those illustrated and described in the present disclosure.

Figure 2:
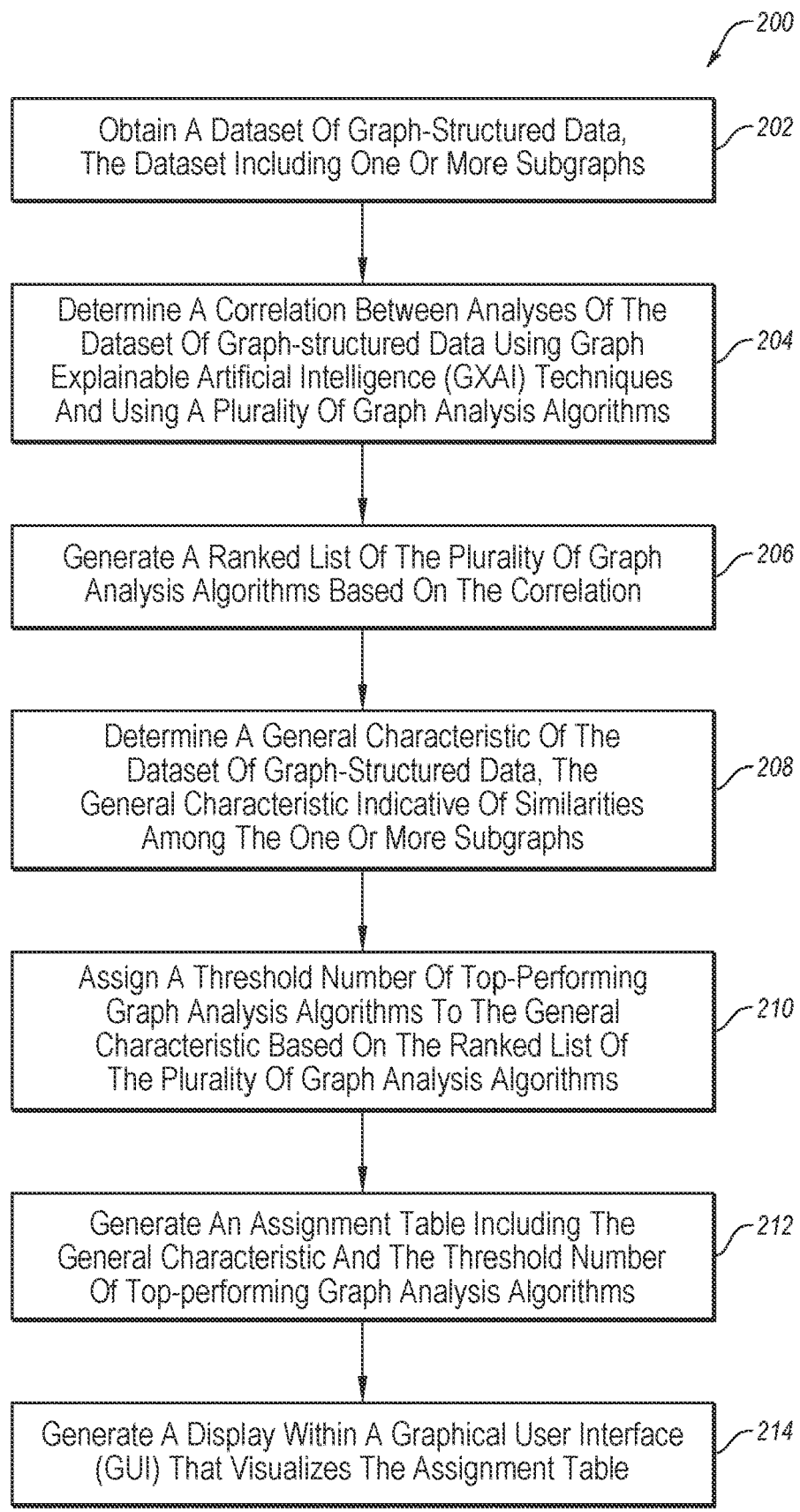
FIG. 2 illustrates a flowchart of an example method to classify graph analysis algorithms.

FIG. 2 illustrates a flowchart of an example method 200 to classify graph analysis algorithms according to at least one embodiment of the present disclosure. The method 200 may be performed by any suitable system, apparatus, or device. For example, the computing system 500 of FIG. 5 may perform one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may include, at block 202, obtaining a dataset of graph-structured data. In some embodiments, the dataset may include one or more subgraphs. Each of the one or more subgraphs may include one or more nodes and one or more edges. In some embodiments, the one or more subgraphs may share the one or more nodes. In these and other embodiments, the one or more subgraphs may not share the one or more edges.

At block 204, a correlation between analyses of the dataset of graph-structured data using GXAI techniques and using one or more graph analysis algorithms may be determined. In some embodiments, The GXAI analysis may include any machine-learning-assisted or artificial-intelligence-assisted graph analysis techniques that may analyze one or more aspects of a dataset of graph-structured data. Additionally or alternatively, the machine-learning module may be trained using a training dataset of graph-structured data that includes one or more subgraphs that already include a label or annotations regarding patterns identified in the subgraphs and a GNN. For example, the GXAI analysis may be executed by a computing system that includes a machine-learning module configured to perform a clustering algorithm or a pattern recognition routine using a graph neural network or any other GXAI algorithms. The GXAI algorithms may be configured to analyze topology of one or more datasets of graph-structured data and make predictions based on the analyzed topology. In some embodiments, one or more explainers may be used to determine specifications of the GXAI algorithms. For example, the one or more explainers may describe types of explanations provided, whether learning procedures are involved, what tasks each explainer may apply to, targets of explanations, computational flow or explanations, and whether the explanation method has specific designs for graph data.

In some embodiments, the GXAI analysis may determine edge-based or node-based contribution scores that may be stored as vector representations such that each element of the vector may correspond to a respective edge or node of a particular dataset of graph-structured data. A greater contribution score for a particular edge or a particular node may indicate that the particular edge or the particular node provides a greater contribution to a classification or regression result of the GXAI analysis (or in other words, the particular edge or the particular node influences the GXAI analysis more strongly). In these and other embodiments, the elements of the vector representations of the GXAI analysis (i.e., the contribution scores of each node or edge) may be normalized to facilitate comparison of the vector representations of the GXAI analysis with results of various graph analysis algorithms as described below.

In some embodiments, the graph analysis algorithms may include any analysis techniques of graph-structured data that are used to represent one or more aspects of a dataset of the graph-structured data. The graph analysis algorithms may analyze the nodes of the graph-structured data included in the dataset. Additionally or alternatively, the graph analysis algorithms may analyze the edges of the graph-structured data included in the dataset. An example of a particular graph analysis algorithm may include a network motif analysis that identifies one or more patterns of nodes and edges that occur in the dataset of graph-structured data in which occur more frequently than node-and-edge configurations present in randomized networks of graph-structured data.

Another example of a particular graph analysis algorithm may include a node-based PageRank analysis in which each node of the dataset of graph-structured data is assigned a value indicative of an influence each node has on the dataset. The influence of a particular node may be determined, for example, according to a number of edges connecting the particular node to other nodes. In the PageRank analysis, the values determined for each of the nodes may be represented as a vector in which each entry of the vector corresponds to a node of the dataset of graph-structured data. Additionally or alternatively, the values determined by the PageRank analysis may be normalized (e.g., by dividing every value by the greatest value) such that the results of the PageRank analysis, represented by a normalized vector, may be more readily compared with the results of other graph analysis algorithms or the results of the GXAI analysis techniques.

Another example of a particular graph analysis algorithm may include an edge-based shortest path analysis in which each edge of the dataset of graph-structured data is assigned a value indicative of an influence each node has on the dataset. The influence of a particular edge may be determined, for example, based on how many times the particular edge appears in a shortest path between any two nodes of the graph-structured data. Each edge may be represented as an entry of a vector, and a value of the entry may indicate how many times the edge is included in the shortest path between two nodes. Additionally or alternatively, the vector values determined by the shortest path analysis may be normalized to facilitate comparison between the shortest path vector and any other vectors, such as the PageRank vector.

In some embodiments, the correlation between the first result and the second result may include a comparison of a first vector corresponding to the first result (e.g., a vector representation of the results of the GXAI analysis) and a second vector corresponding to the second result (e.g., a vector representation of the results of the graph analysis algorithms). The comparison between the first vector and the second vector may be accomplished using any vector comparison technique. In some embodiments, the correlation may include a similarity score based on the first vector and the second vector. For example, in these and other embodiments, the similarity score may include a cosine similarity or a Pearson correlation coefficient. For instance, using the cosine similarity, the similarity score of zero may indicate no correlation, while the similarity score of one may indicate a strong correlation. For the Pearson correlation coefficient, the similarity score of zero may indicate no correlation, while the similarity score of negative one or positive one may indicate strong correlation.

At block 206, a ranked list of the one or more graph analysis algorithms may be generated based on the correlation. In some embodiments, the correlation and the one or more graph analysis algorithms may be obtained. The ranked list may list the graph analysis algorithms in order of the correlation. For example, the one or more graph analysis algorithms may be listed in the order of descending correlation.

In some embodiments, the ranked list may be generated as a table. For example, the table may include a first column including the one or more graph analysis algorithms. Additionally or alternatively, the table may include a second column including the correlation. For example, the correlation scores may be ordered in the table in a certain order. For instance, the correlation scores may be ordered in a descending order. In some embodiments, the correlations scores may be ordered in an ascending order. In these and other embodiments, the one or more graph analysis algorithms may be ordered in the table according to the corresponding correlation scores.

At block 208, a general characteristic of the dataset of graph-structured data may be determined. In some embodiments, the general characteristic may be indicative of similarities among the one or more subgraphs included within the dataset. In some embodiments, the general characteristic may be determined numerically. For example, the general characteristic may be represented as an average vector indicative of similarities among the one or more subgraphs. For instance, a vector for each of the one or more subgraphs may be generated. The vector may be generated using any suitable techniques such as Graph2Vec. The average vector may be generated by computing an average of the vector for each of the one or more subgraphs.

At block 210, a threshold number of top-performing graph analysis algorithms may be assigned to the general characteristic. In some embodiments, the assignment may be based at least on the ranked list of the one or more graph analysis algorithms. For example, the ranked list may list the one or more graph analysis algorithms in a descending order of the correlation scores. In these and other embodiments, the threshold number may determine a certain number of the graph analysis algorithms to be assigned. For example, the certain number of the graph analysis algorithms with the highest correlation scores may be assigned to the general characteristic.

In some embodiments, the threshold number may define a correlation score threshold. For example, the threshold number may define a certain correlation score to be exceeded. For instance, any number of the graph analysis algorithms with the correlation score above the certain correlation score set by the threshold number may be assigned to the general characteristic.

At block 212, an assignment table including the general characteristic and the threshold number of top-performing graph analysis algorithms may be generated. For example, the assignment table may include at least a first column and a second column. The first column may include the general characteristic, and the second column may include the graph analysis algorithms assigned to the general characteristic.

At block 214, a display within a GUI may be generated that visualizes the assignment table. For example, the GUI may be configured to display the assignment table with the first column including the general characteristic and the second column including the graph analysis algorithms. In some embodiments, the GUI may display the assignment table in a different format. For example, the GUI may display the assignment table as a list or any suitable graphical illustration. Additionally or alternatively, the GUI may be configured to display a summary of various statistics relating to the dataset of graph-structured data. In some embodiments, the displaying of the assignment table within the GUI may include one or more operations such as described with respect to FIG. 1 with respect to displaying the assignment table 165 on the GUI 175.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

For example, the method 200 may further include obtaining a second dataset of graph-structured data and determining a second general characteristic of the second dataset of graph-structured data. The second general characteristic may be compared to the general characteristic. In response to determining that the second general characteristic is similar to the general characteristic, the second assignment table may be generated including the second general characteristic and the threshold number of graph analysis algorithms which may be retrieved form the assignment table.

In some embodiments, the second general characteristic may not be similar to the general characteristic. In these and other embodiments, a second ranked list of graph analysis algorithms may be generated based on a second correlation between analyses of the second dataset of graph-structured data using GXAI techniques and the graph analysis algorithms.

Figure 3:
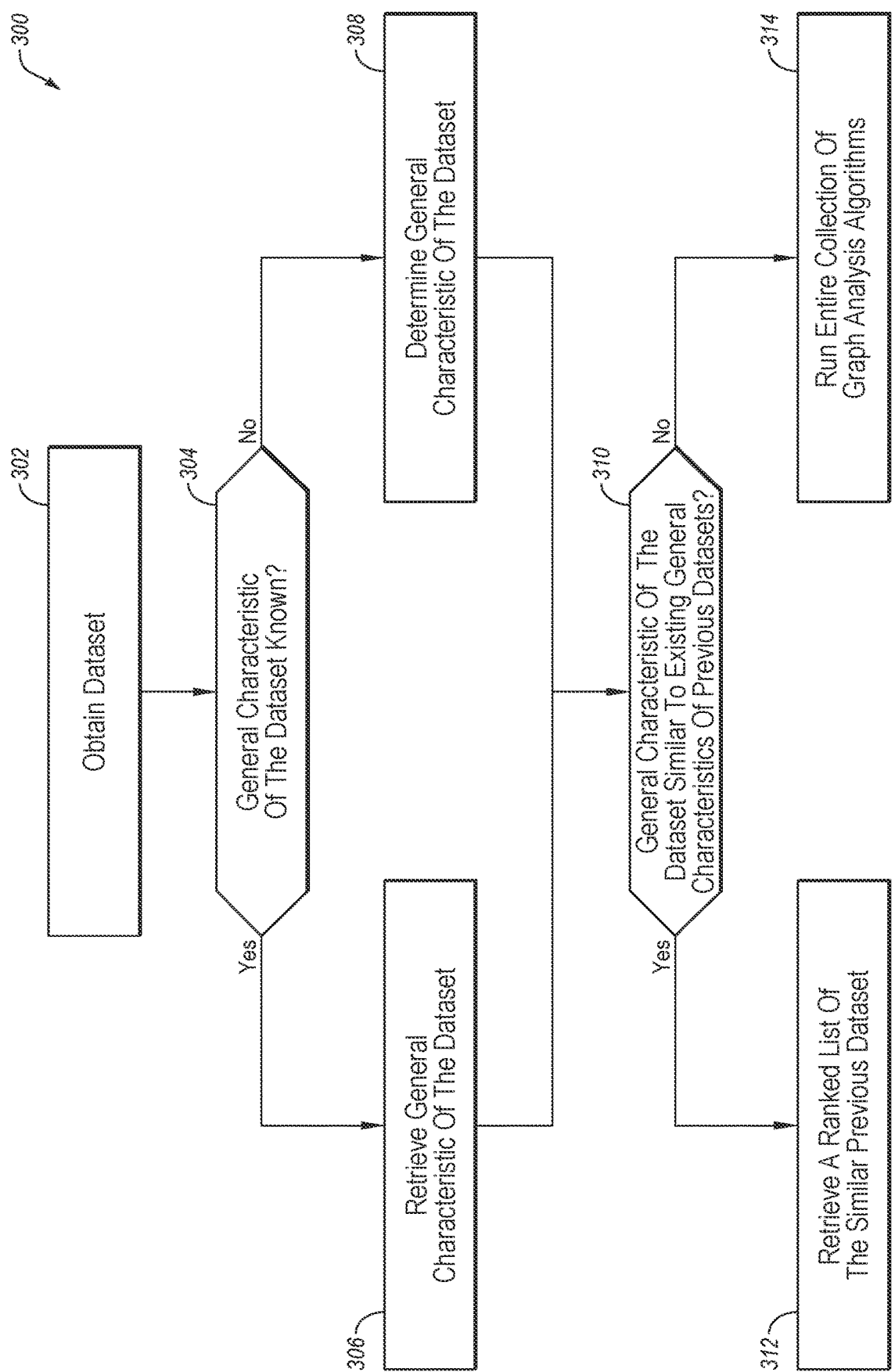
FIG. 3 illustrates a flowchart of example method to select a graph analysis algorithm for a dataset.

FIG. 3 illustrates a flowchart of example method to select a graph analysis algorithm for a dataset, according to at least one embodiment of the present disclosure. The method 300 may be performed by any suitable system, apparatus, or device. For example, the computing system 500 of FIG. 5 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a dataset of graph-structured data may be obtained. In some embodiments, the dataset of graph-structured data may include one or more subgraphs. The one or more subgraphs may be graphs in the dataset of graph-structured data. For example, the one or more subgraphs may each include a subset of vertices and edges that are part of the dataset. In some embodiments, the dataset may be provided by a user. For example, the user may specify which dataset is to be analyzed. In some embodiments, the dataset may be retrieved from a data storage. Additionally or alternatively, the dataset may be provided from another system. The dataset may include any type of data that may be represented in a graph format. For example, in some embodiments, the dataset may include collections of financial transactions. Each collection may be represented as a subgraph of the dataset. For example, nodes may represent people or entities involved in financial transactions while edges may represent particular transactions between two nodes. In some embodiments, the edges may be represented as arrows having a direction. For example, the edges may point from a particular node to another. In some embodiments, the edges may be represented as connection between the nodes without a particular direction.

At block 304, it may be determined whether a general characteristic of the dataset is known. For example, in some embodiments, the user providing the dataset may be aware of the general characteristic of the dataset. In some embodiments, the general characteristic of the dataset may have previously been determined. In some embodiments, the general characteristic may have been determined by another system. In some embodiments, the dataset may include the general characteristic associated with the dataset. For example, the general characteristic may be provided along with the dataset. In response to determining that the general characteristic is known, the method 300 may proceed to block 306.

At block 306, the general characteristic of the dataset may be retrieved. For example, in some embodiments, the general characteristic may be retrieved from the data storage. As another example, the general characteristic may be provided by the user providing the dataset. In some embodiments, the general characteristic may be accompanied by the dataset.

In some embodiments, the general characteristic of the dataset may not be known. For example, the dataset may be an unseen dataset that the general characteristic may have not been previously determined. In these instances, the method 300 may proceed to from block 304 to block 308. At block 308, the general characteristic of the dataset may be determined. In some embodiments, the general characteristic may be indicative of similarities among the one or more subgraphs in the dataset.

In some embodiments, the similarities among the one or more subgraphs may include structural similarities among the one or more subgraphs, such as graph topology, node connections, and node neighborhoods. In these and other embodiments, a clustering algorithm may be used to determine the general characteristic. For example, the clustering algorithm may be used to divide nodes in the one or more subgraphs into groups or clusters. The partitioning may be done based on topological criteria such as graph structure and/or location of nodes on a graph. Continuing the example of the dataset including collections of financial transactions, a particular cluster may include nodes that are connected to a particular node representing a bank. For instance, the cluster may include all persons or entities that have direct financial transactions with the bank. In some instances, the particular cluster may be divided into separate clusters representing incoming transfers at the bank and outgoing transfers from the bank. For example, a cluster may include all nodes that are depositing money to the bank, while another cluster may include all nodes that are withdrawing money from the bank. In some embodiments, any suitable clustering algorithm may be used. For example, Markov Cluster Algorithm, Molecular Complex Detection, Highly Connected Subgraphs, and Restricted Neighborhood Search Clustering, among others, may be used to determine a general characteristic of the dataset.

In some embodiments, the general characteristic may be presented in a vector format. For example, the general characteristic may be presented as an average vector that averages one or more vectors corresponding to the one or more subgraphs. In these and other embodiments, the one or more subgraphs may be converted into the one or more vectors using any suitable graph embedding methods, such as Graph2Vec. In these and other embodiments, the one or more vectors may be configured to be at a same length. For example, the one or more vectors may be configured to be in a predetermined fixed length.

At block 310, it may be determined whether the general characteristic of the dataset is similar to any existing general characteristics of previous datasets. In some embodiments, the previous datasets may include one or more datasets that corresponding graph analysis algorithms have been determined according to the process 100 of FIG. 1. In some embodiments, the existing general characteristics may be stored in a data storage or memory. In these and other embodiments, the general characteristic may be compared against each of the existing general characteristics. For example, in some embodiments, comparison scores corresponding to comparisons between the general characteristic and each of the existing general characteristics may be determined. In some embodiments, the general characteristic and the existing general characteristics may each be in a vector representation. In these and other embodiments, the comparison between the general characteristic and the existing general characteristics may include any vector comparison metrics, such as a cosine similarity. For example, the comparison scores may be represented as a value between 0 and 1, where 0 indicates no similarity and 1 indicates strong similarity. In some embodiments, a similarity threshold may be applied to the comparison scores. For example, the similarity threshold may be a number between 0 and 1. In instances where the comparison scores satisfy the similarity threshold, the general characteristic may be determined as being similar to corresponding existing general characteristic. The comparison scores may satisfy the similarity threshold by being equal to or greater than the similarity threshold.

In some embodiments, the general characteristic may be similar to one or more existing general characteristics. In these instances, the method 300 may proceed to block 312. At block 312, one or more ranked lists of graph analysis algorithms associated with similar existing general characteristics may be retrieved. The one or more ranked lists may each include one or more graph analysis algorithms that have been ranked according to corresponding correlation scores. For example, the one or more ranked lists may have been generated with respect to the previous datasets. In some embodiments, the one or more ranked lists may have been generated in a similar manner to the ranked list 155 of FIG. 1 and/or method 400 of FIG. 4. In some embodiments, graph analysis algorithms present in the one or more ranked lists may be associated with the general characteristic. For example, the one or more ranked lists may be assigned to the general characteristic in a same manner the one or more ranked lists were assigned to the existing general characteristics. In some embodiments, the graph analysis algorithms present in the one or more ranked lists may include graph analysis algorithms that may be suited for analyzing the dataset. For example, the graph analysis algorithms with the highest ranks (e.g., 1) may be best suited for the dataset. In these and other embodiments, the ranked lists may provide a system and/or a user a list of graph analysis algorithms that may be selected to analyze the dataset.

In some embodiments, the general characteristic may not be similar to any of the existing general characteristics. For example, none of the comparison scores may satisfy the similarity threshold. In these and other embodiments, the method 300 may proceed to block 314, and the graph analysis algorithms may be processed using the dataset. For example, the method 200 of FIG. 2 may be performed using the dataset as input.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 4:
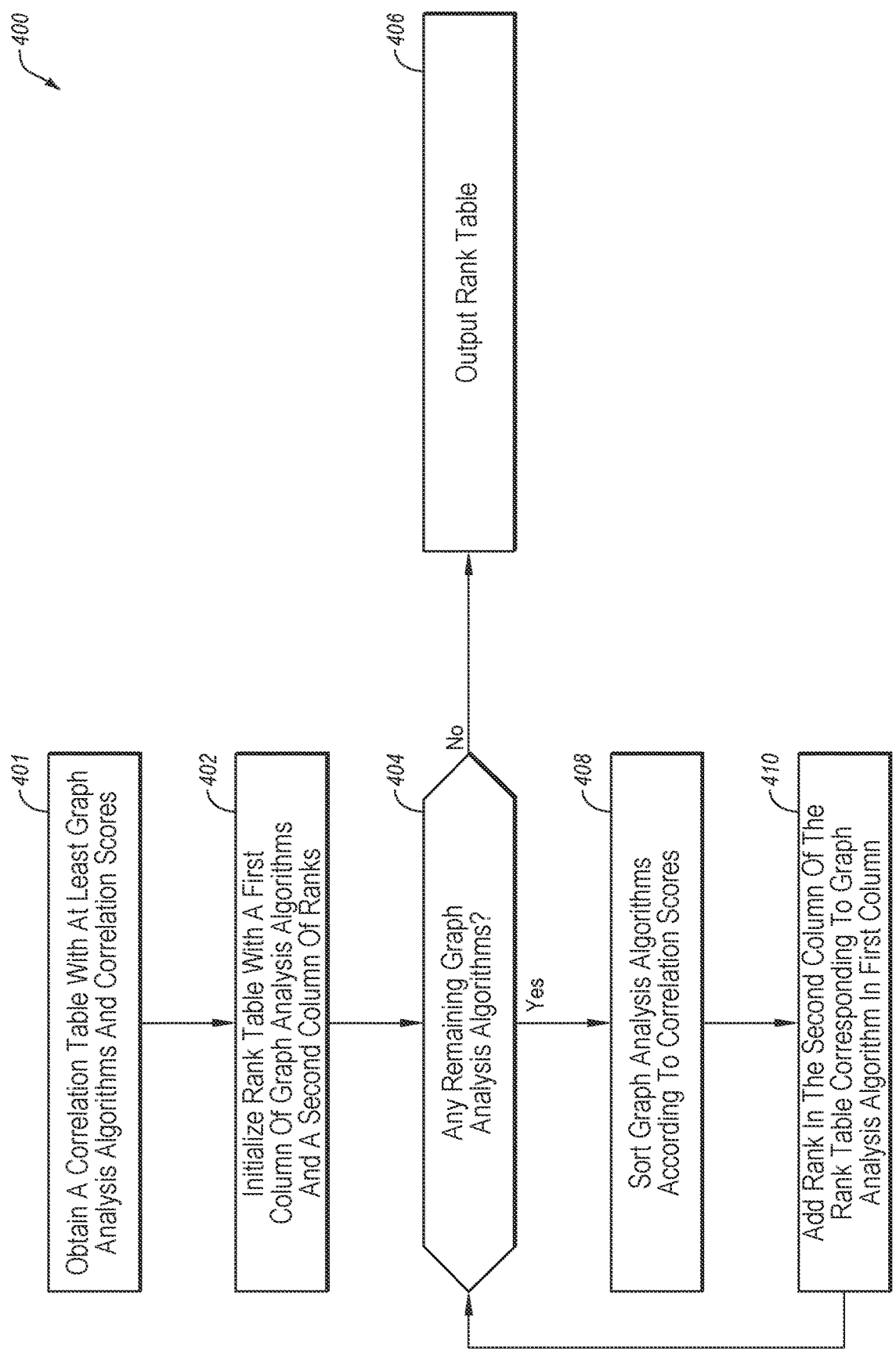
FIG. 4 illustrates a flowchart of an example method of generating a rank table of graph analysis algorithms.

FIG. 4 illustrates a flowchart of an example method of generating a rank table of graph analysis algorithms, according to at least one embodiment of the present disclosure. The method 400 may be performed by any suitable system, apparatus, or device. For example, the ranking module 150 of FIG. 1 and/or the computing system 500 of FIG. 5 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation. In some embodiments, the method 400 may correspond to operations the ranking module 150 may take to generate the ranked list 155 in FIG. 1.

At block 401, a correlation table including at least the graph analysis algorithms and correlation scores corresponding to the graph analysis algorithms may be obtained. For example, the correlation table may correspond to the correlation table generated by the correlation module 140 of FIG. 1. For example, the first column may include the graph analysis algorithms and the second column may include corresponding correlation scores. In some embodiments, the correlation scores may correspond to the correlation scores 145 of FIG. 1.

At block 402, a rank table may be generated with at least a first column and a second column. In some embodiments, the first column may include the graph analysis algorithms and the second column may include ranks corresponding to the graph analysis algorithms in the first column. In some embodiments, the first column may be initialized with all of the graph analysis algorithms analyzed. In these and other embodiments, the first column may be initialized in any order. For example, the first column may be initialized in the order the graph analysis algorithms were obtained. In these and other embodiments, the correlation table and the rank table may include the same list of the graph analysis algorithms. In some embodiments, the graph analysis algorithms in the rank table may be initialized in same order as the graph analysis algorithms in the correlation table. In some embodiments, the second column may be initialized to zero. For example, the graph analysis algorithms may not have been ranked.

At block 404, it may be determined whether a graph analysis algorithm remains in the correlation table. For example, the graph analysis algorithm may be described as remaining in the correlation table where the graph analysis algorithm has not been ranked in the rank table. For example, the graph analysis algorithm may not be ranked in the rank table where the second column corresponding to the graph analysis algorithm remains as zero. In response to determining that no graph analysis algorithms remain, the method 400 may proceed to block 406. At block 406, the rank table may be finalized and output.

In response to determining that at least one graph analysis algorithm remains in the correlation table, the method 400 may proceed to block 408. At block 408, the graph analysis algorithms in the correlation table may be sorted according to the corresponding correlation scores. For example, the graph analysis algorithms may be sorted in a descending order of the correlation scores.

At block 410, a rank may be added to the second column of the rank table corresponding to the graph analysis algorithm in the first column. For example, the graph analysis algorithm at the top of the correlation table after sorting may be given 1 as the rank. For instance, a corresponding graph analysis algorithm may be located in the rank table and corresponding 0 in the second column of the rank table may be updated with the given rank. A second graph analysis algorithm in the correlation table may be given 2 as the rank. In some embodiments, the process of providing the rank to the graph analysis algorithms in the rank table may be repeated until all the graph analysis algorithms are given a rank. For example, the method 400 may return to block 404 until there is no more remaining graph analysis algorithm in the correlation table. In some embodiments, the rank table may be sorted according to the ranks after each graph analysis algorithm has been given a rank. For example, the rank table may be sorted so that the graph analysis algorithm with the highest rank (e.g., 1) may be at top of the list. Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 5:
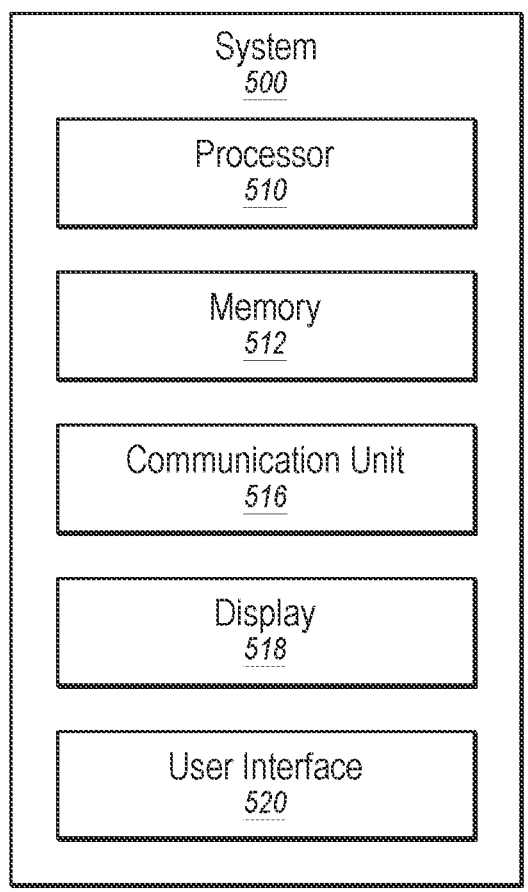
FIG. 5 illustrates an example computing system, all arranged according to at least one embodiment of the present disclosure.

FIG. 5 is a block diagram illustrating an example system 500 that may be used for optical signal amplification, according to at least one embodiment of the present disclosure. The system 500 may include a processor 510, memory 512, a communication unit 516, a display 518, and a user interface unit 520, which all may be communicatively coupled. In some embodiments, the system 500 may be used to perform one or more of the methods described in this disclosure. For example, the system 500 may be used to assist in the performance of the method described in FIG. 1. For example, the system 500 may be used to classify graph analysis algorithms according to at least one embodiment of the present disclosure.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 610 may include any number of processors distributed across any number of networks or physical locations that are configured to perform individually or collectively any number of operations described herein. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to task execution such that the system 500 may perform or direct the performance of the operations associated therewith as directed by the instructions. In these and other embodiments, the instructions may be used to perform one or more blocks of methods 200, 300, and 400 of FIGS. 2-4 and/or the process flow described in FIG. 1.

The memory 512 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure.

The display 518 may be configured as one or more displays, like an LCD, LED, Braille terminal, or other type of display. The display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, buttons, camera, and/or a touchscreen, among other devices. The user interface unit 520 may receive input from a user and provide the input to the processor 510. In some embodiments, the user interface unit 520 and the display 518 may be combined.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 510 of FIG. 5) including various computer hardware or software modules, as discussed in greater detail below. Further, as indicated above, embodiments described herein may be implemented using computer-readable media (e.g., the memory 512 of FIG. 5) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   obtaining a dataset of graph-structured data, the dataset including one or more subgraphs;
   computing a first set of analyses of the dataset of graph-structured data using graph explainable artificial intelligence (GXAI) techniques and a second set of analyses of the dataset of graph-structured data using a plurality of graph analysis algorithms;
   determining a correlation between the first set of analyses and the second set of analyses, the correlation representing performance of each graph analysis algorithm of the plurality of graph analysis algorithms in analyzing the dataset of graph-structured data;
   generating a ranked list of the plurality of graph analysis algorithms based on the correlation;

determining a general characteristic of the dataset of graph-structured data, the general characteristic indicative of similarities among the one or more subgraphs;
assigning a threshold number of analysis algorithms to the general characteristic based on the ranked list of the plurality of graph analysis algorithms;
generating an assignment table including the general characteristic and the threshold number of graph analysis algorithms; and
generating a display within a graphical user interface (GUI) that visualizes the assignment table.

2. The method of claim 1, wherein using the GXAI techniques comprises:
training a machine-learning (ML) model based on the dataset of graph-structured data and a graph neural network (GNN); and
generating, by a GNN explainer, numerical contribution scores indicating how each node or edge of the dataset of graph-structured data contribute to training the ML model.

3. The method of claim 1, wherein determining the correlation between the analyses of the dataset of graph-structured data using the GXAI techniques and using the plurality of graph analysis algorithms comprises:
generating a first vector of a first analysis using the GXAI techniques;
generating a second vector of a second analysis using the plurality of graph analysis algorithms; and
computing a similarity score based on the first vector and the second vector.

4. The method of claim 1, wherein generating the ranked list of the graph analysis algorithms based on the correlation comprises:
generating a rank table with at least a first column and a second column, wherein the first column includes the graph analysis algorithms, and the second column indicates ranks of the graph analysis algorithms;
ranking the graph analysis algorithms with rank numbers based on the correlation;
sorting the rank table according to the rank numbers; and
outputting the rank table.

5. The method of claim 1, wherein determining the general characteristic of the dataset of graph-structured data comprises:
generating a vector for each of the one of more subgraphs; and
computing an average vector of the vectors of the one or more subgraphs.

6. The method of claim 1, further comprising:
obtaining a second dataset of graph-structured data;
determining a second general characteristic of the second dataset of graph-structure data;
determining that the second general characteristic is similar to the general characteristic;
retrieving the assignment table;
assigning the threshold number of analysis algorithms present in the assignment table to the second general characteristic;
generating a second assignment table including the second general characteristic and the threshold number of graph analysis algorithms; and
generating the display within the GUI that visualizes the second assignment table.

7. The method of claim 1, further comprising:
obtaining a second dataset of graph-structured data;
determining a second general characteristic of the second dataset of graph-structure data;
determining that the second general characteristic is not similar to the general characteristic; and
generating a second ranked list of the plurality of graph analysis algorithms based on a second correlation between analyses of the second dataset of graph-structured data using GXAI techniques and the plurality of graph analysis algorithms.

8. One or more non-transitory computer-readable storage media configured to store instructions that, in response to being executed, cause a system to perform operations, the operations comprising:
obtaining a dataset of graph-structured data, the dataset including one or more subgraphs;
computing a first set of analyses of the dataset of graph-structured data using graph explainable artificial intelligence (GXAI) techniques and a second set of analyses of the dataset of graph-structured data using a plurality of graph analysis algorithms;
determining a correlation between the first set of analyses and the second set of analyses, the correlation representing performance of each graph analysis algorithm of the plurality of graph analysis algorithms in analyzing the dataset of graph-structured data;
generating a ranked list of the plurality of graph analysis algorithms based on the correlation;
determining a general characteristic of the dataset of graph-structured data, the general characteristic indicative of similarities among the one or more subgraphs;
assigning a threshold number of top-performing graph analysis algorithms to the general characteristic based on the ranked list of the plurality of graph analysis algorithms;
generating an assignment table including the general characteristic and the threshold number of top-performing graph analysis algorithms; and
generating a display within a graphical user interface (GUI) that visualizes the assignment table.

9. The one or more non-transitory computer-readable storage media of claim 8, wherein using the GXAI techniques comprises:
training a machine-learning (ML) model based on the dataset of graph-structured data and a graph neural network (GNN); and
generating, by a GNN explainer, numerical contribution scores indicating how each node or edge of the dataset of graph-structured data contribute to training the ML model.

10. The one or more non-transitory computer-readable storage media of claim 8, wherein determining the correlation between the analyses of the dataset of graph-structured data using the GXAI techniques and using the plurality of graph analysis algorithms comprises:
generating a first vector of a first analysis using the GXAI techniques;
generating a second vector of a second analysis using the plurality of graph analysis algorithms; and
computing a Pearson correlation coefficient or a cosine similarity based on the first vector and the second vector.

11. The one or more non-transitory computer-readable storage media of claim 8, wherein generating the ranked list of the graph analysis algorithms based on the correlation comprises:
generating a rank table with at least a first column and a second column, wherein the first column includes the graph analysis algorithms, and the second column indicates ranks of the graph analysis algorithms;

ranking the graph analysis algorithms with rank numbers based on the correlation, lower rank numbers reflecting stronger correlations;
sorting the rank table according to the rank numbers; and
outputting the rank table.

12. The one or more non-transitory computer-readable storage media of claim 8, wherein determining the general characteristic of the dataset of graph-structured data comprises:
generating a vector for each of the one of more subgraphs; and
computing an average vector of the vectors of the one or more subgraphs.

13. The one or more non-transitory computer-readable storage media of claim 8, further comprising:
obtaining a second dataset of graph-structured data;
determining a second general characteristic of the second dataset of graph-structure data;
determining that the second general characteristic is similar to the general characteristic;
retrieving the assignment table;
assigning the threshold number of analysis algorithms present in the assignment table to the second general characteristic;
generating a second assignment table including the second general characteristic and the threshold number of graph analysis algorithms; and
generating the display within the GUI that visualizes the second assignment table.

14. The one or more non-transitory computer-readable storage media of claim 8, further comprising:
obtaining a second dataset of graph-structured data;
determining a second general characteristic of the second dataset of graph-structure data;
determining that the second general characteristic is not similar to the general characteristic; and
generating a second ranked list of the plurality of graph analysis algorithms based on a second correlation between analyses of the second dataset of graph-structured data using GXAI techniques and the plurality of graph analysis algorithms.

15. A system, comprising:
one or more processors; and
one or more non-transitory computer-readable storage media configured to store instructions that, in response to being executed, cause the system to perform operations, the operations comprising:
obtaining a dataset of graph-structured data, the dataset including one or more subgraphs;
computing a first set of analyses of the dataset of graph-structured data using graph explainable artificial intelligence (GXAI) techniques and a second set of analyses of the dataset of graph-structured data using a plurality of graph analysis algorithms;
determining a correlation between the first set of analyses and the second set of analyses, the correlation representing performance of each graph analysis algorithm of the plurality of graph analysis algorithms in analyzing the dataset of graph-structured data;
generating a ranked list of the plurality of graph analysis algorithms based on the correlation;
determining a general characteristic of the dataset of graph-structured data, the general characteristic indicative of similarities among the one or more subgraphs;
assigning a threshold number of top-performing graph analysis algorithms to the general characteristic based on the ranked list of the plurality of graph analysis algorithms;
generating an assignment table including the general characteristic and the threshold number of top-performing graph analysis algorithms; and
generating a display within a graphical user interface (GUI) that visualizes the assignment table.

16. The system of claim 15, wherein using the GXAI techniques comprises:
training a machine-learning (ML) model based on the dataset of graph-structured data and a graph neural network (GNN); and
generating, by a GNN explainer, numerical contribution scores indicating how each node or edge of the dataset of graph-structured data contribute to training the ML model.

17. The system of claim 15, wherein determining the correlation between the analyses of the dataset of graph-structured data using the GXAI techniques and using the plurality of graph analysis algorithms comprises:
generating a first vector of a first analysis using the GXAI techniques;
generating a second vector of a second analysis using the plurality of graph analysis algorithms; and
computing a Pearson correlation coefficient or a cosine similarity based on the first vector and the second vector.

18. The system of claim 15, wherein generating the ranked list of the graph analysis algorithms based on the correlation comprises:
generating a rank table with at least a first column and a second column, wherein the first column includes the graph analysis algorithms, and the second column indicates ranks of the graph analysis algorithms;
ranking the graph analysis algorithms with rank numbers based on the correlation, lower rank numbers reflecting stronger correlations;
sorting the rank table according to the rank numbers; and
outputting the rank table.

19. The system of claim 15, wherein determining the general characteristic of the dataset of graph-structured data comprises:
generating a vector for each of the one of more subgraphs; and
computing an average vector of the vectors of the one or more subgraphs.

20. The system of claim 15, further comprising:
obtaining a second dataset of graph-structured data;
determining a second general characteristic of the second dataset of graph-structure data;
determining that the second general characteristic is similar to the general characteristic;
retrieving the assignment table;
assigning the threshold number of analysis algorithms present in the assignment table to the second general characteristic;
generating a second assignment table including the second general characteristic and the threshold number of graph analysis algorithms; and
generating the display within the GUI that visualizes the second assignment table.

* * * * *